US007792042B2

(12) United States Patent
Golla et al.

(10) Patent No.: US 7,792,042 B2
(45) Date of Patent: Sep. 7, 2010

(54) CLASSIFICATION OF SIGNALING PROTOCOL ERRORS TO TRIGGER NETWORK CONNECTIVITY TROUBLESHOOTING

(75) Inventors: Ramprasad Golla, San Jose, CA (US); Sudhir Rao, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 454 days.

(21) Appl. No.: 11/731,586

(22) Filed: Mar. 29, 2007

(65) Prior Publication Data
US 2008/0239944 A1 Oct. 2, 2008

(51) Int. Cl.
H04L 12/26 (2006.01)
(52) U.S. Cl. ..................... 370/242; 370/252
(58) Field of Classification Search ......... 370/216–228, 370/241–253
See application file for complete search history.

(56) References Cited

U.S. PATENT DOCUMENTS

| | | | |
|---|---|---|---|
| 6,621,793 B2 | 9/2003 | Widegren et al. | |
| 6,879,812 B2 * | 4/2005 | Agrawal et al. | 455/67.11 |
| 7,028,311 B2 | 4/2006 | Roach et al. | |
| 7,106,718 B2 | 9/2006 | Oyama et al. | |
| 7,266,081 B2 | 9/2007 | Suum ki et al. | |
| 7,421,506 B2 | 9/2008 | Ni et al. | |
| 2001/0056564 A1 * | 12/2001 | Cypher | 714/758 |
| 2005/0144272 A1 * | 6/2005 | Herzberg | 709/224 |
| 2008/0248804 A1 * | 10/2008 | Al-Bakri et al. | 455/450 |

\* cited by examiner

*Primary Examiner*—Ricky Ngo
*Assistant Examiner*—Wei-Po Kao
(74) *Attorney, Agent, or Firm*—Bainwood Huang

(57) ABSTRACT

In an embodiment, a system and method which monitors a signaling plane for error events among one or more network nodes in a converged network. The system and method classifies and calculates, based on user defined parameters, a threshold value or percentage of error events which occur within a desired amount of time and automatically triggers an alert in the network that a potential network connectivity problem exists in the transport plane. In an embodiment, the trigger automatically initiates troubleshooting procedures to solve the network connectivity problem.

17 Claims, 2 Drawing Sheets

CLASSIFICATION OF SIGNALING PROTOCOL ERRORS TO TRIGGER NETWORK CONNECTIVITY TROUBLESHOOTING

TECHNICAL FIELD

The present disclosure relates generally to troubleshooting network connectivity issues.

BACKGROUND

Converged network architectures such as IP Multimedia Subsystem (IMS) and Internet Protocol Television (IPTV) have distinct signaling/control and transport/bearer planes. In an IMS architecture, Standard Internet Protocol (SIP) based signaling is used for call/session setup prior to actually transmitting data along the transport plane. Signaling protocols such as SIP have well defined error codes to identify failures or errors in the network. Signaling nodes such as SIP servers maintain these error metrics. For the service providers which maintain one or more of the network domains, it is a challenge to correlate the signaling plane errors, such as timeout requests, with underlying problems in the transport plane. In addition, it is a challenge for the service providers to identify the probable root cause of the error when the converged network spans several different network domains. This problem is also magnified due to the lack of good management solutions which provide comprehensive solutions across the signaling and transport planes. There is a need for a management solution that has the domain knowledge of a converged network architecture and provides an integrated solution across the two planes.

OVERVIEW

In an embodiment, a system and method monitors error events in a signaling plane among one or more network nodes which are in a converged network. The system and method classifies and calculates, based on user defined parameters, a threshold value or percentage of error events which occur within a desired amount of time and automatically triggers an alert in the network that a potential network connectivity problem exists in the transport plane. In an embodiment, the trigger automatically initiates troubleshooting procedures to solve the network connectivity problem.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

In the drawings.

DESCRIPTION OF EXAMPLE EMBODIMENTS

Figure 1:
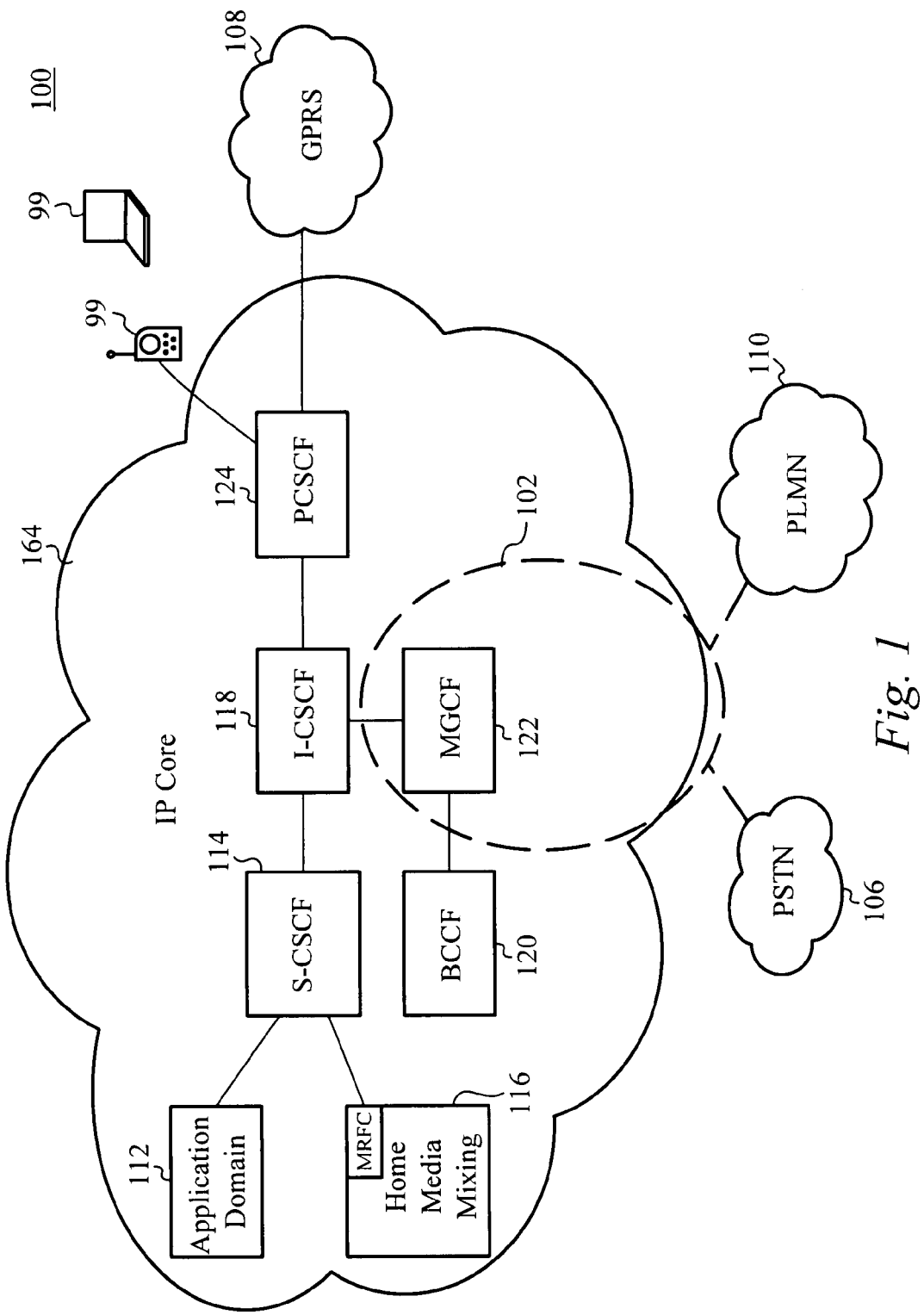
FIG. 1 illustrates an example system of a converged network architecture in accordance with an embodiment.

Example embodiments are described herein in the context of a system of computers, servers, and software. Those of ordinary skill in the art will realize that the following description is illustrative only and is not intended to be in any way limiting. Other embodiments will readily suggest themselves to such skilled persons having the benefit of this disclosure. Reference will now be made in detail to implementations of the example embodiments as illustrated in the accompanying drawings. The same reference indicators will be used throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with this disclosure, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Eraseable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card, paper tape and the like) and other types of program memory.

In an embodiment, a method for identifying a potential network connectivity problem in a converged network by monitoring a signaling plane in at least a portion of the network for error events. The method automatically sends an alert which identifies a network problem in a transport plane upon determining a threshold number of error events occurring in the signaling plane over a desired time period.

In an embodiment, a method for identifying a potential network connectivity problem in a converged network by receiving management information from a network node regarding error events occurring in a signaling plane across the converged network. The method automatically sends an alert identifying a potential network problem in a transport plane in the converged network upon determining a set number of error events occurring within a desired time period.

In an embodiment, an apparatus which identifies a potential network connectivity problem in a converged network. The apparatus includes means for monitoring a signaling plane in the network for error events and means for automatically sending an alert identifying a potential network problem in a transport plane upon monitoring a set number of error events occurring within a desired time period.

In one or more embodiments, the system and method may classify the error events based on one or more user defined parameters, wherein the threshold number of error events are based on the classified error events. The system and method may receive the error events from one or more network nodes in the network. However, in an embodiment, the error events correspond to a network connectivity problem in the transport plane. In an embodiment, he system and method may receive error code information from a network node in a specific network domain; and automatically convert the error code information into a common error code. However, in an embodiment, the error events from a network node are received as common error codes in the converged network. The system and method may automatically initiate a troubleshooting procedure to correct the network problem upon sending the alert. In an embodiment, the monitoring and the sending is performed by a component remote from a network node operating in the signaling plane. In an embodiment, the monitoring and the sending is software based and is performed by a network node operating in the signaling plane.

FIG. 1 illustrates a block diagram of a IP Multimedia Subsystem (IMS) network architecture in accordance with an embodiment. The IMS network 100 is a converged network which generally bridges the cellular network 102 with the Internet 104 along with traditional Public Switched Telephone Network (PSTN) 106, General Packet Radio System (GPRS) 108 and Public Land Mobile Network (PLMN) 110 to provide the user with access to data through all the networks through respective service providers using one or more devices 99. The individual networks which are converged into the IMS network 100 are referred to herein as network domains or just domains.

Such a network is advantageous considering that content is now able to traverse several different domains. However, problems in network connectivity in such an expanded network becomes difficult to pinpoint and identify as well as troubleshoot. In other words, it would be difficult to identify and pinpoint a network connectivity problems when an end device 99 operating in the GPRS domain is timing out with an application server located in the PSTN domain.

The network 100 includes an application domain 112 which includes servers and data typically owned and provided by a third party. The core of the IMS architecture is found in the Call Session Control Function (CSCF) nodes which provide session control for subscribers accessing services via the network. In an embodiment, the CSCFs are Standard Internet Protocol (SIP) servers which interact with each other and/or other network nodes to effectively set up a connection and thus provide content to the end devices 99.

As shown in FIG. 1, a Serving Call Session Control Function (S-CSCF) node 114 is coupled to servers and/or other components in the application domain 112 as well as the media resource function controller (MRFC) 116 in an embodiment. The S-CSCF 114 inspects the SIP messages and provides appropriate services including, but not limited to, user registration, routing of information to appropriate application servers in the Application Domain 112, applying user specific profiles to the call and other services. In addition, the S-CSCF node 114 is coupled to the Breakout Gateway Control Function (BGCF) node 120 in an embodiment. The BGCF node 120 includes routing functionality based on telephone numbers to allow communcation between the IP Core 104 and the PSTN 106 or PLMN 110 via a Media Gateway Control Function (MGCF) node 122. The MGCF node 122 provides translation services for carting information across the different types of networks.

An Interrogating CSCF (I-CSCF) node 118 is coupled to the S-CSCF node 114 as well as the MGCF node 122, whereby the I-CSCF 118 is a SIP proxy server that is viewed in the domain name server such that when a remote SIP server wants to forward a message to a CSCF in another domain, it may use the I-CSCF node 118. A proxy CSCF (P-CSCF) node 124 handles all messages which originate or are destined for end terminals 99 and forwards the messages in the appropriate directions. The P-CSCF 124 is coupled to the I-CSCF 118 to allow transfer of content or data to and from the end devices 99 to be handled by the entire network through different network domains (e.g. GPRS, PSTN, Internet, PLMN). The servers and other components are referred to herein as network nodes.

Figure 2:
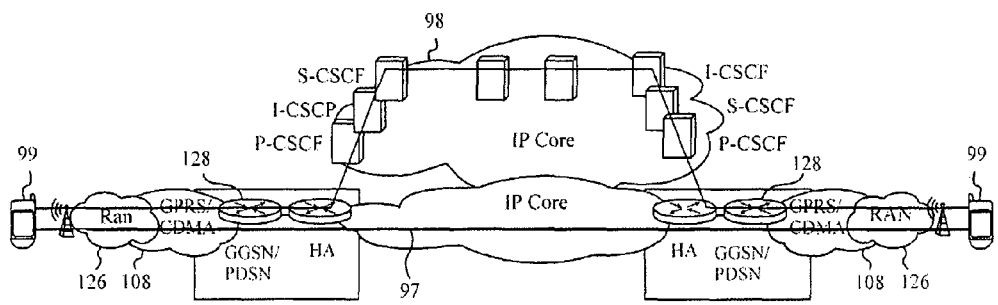
FIG. 2 illustrates an example system between two end devices utilizing signaling and transport planes in accordance with an embodiment.

FIG. 2 illustrates a diagram of two end devices operating in the GPRS network domain in the IMS network architecture in accordance with an embodiment. It should be noted that any number of end device, including one, is contemplated and the example is not limited to just two end devices. As shown in FIG. 2, the end devices 99 each initially communicate with a radio access network (RAN) 126 to handle SIP and call control functions. The RAN 126 communicates with the GPRS domain 108 which is connected to the Gateway GPRS Support Nodes (GGSN) 128. The GGSNs 128 are connected to the IP Core network, whereby the call control and SIP functions in the signal plane are handled by the CSCFs (e.g. P-CSCF, I-CSCF, S-CSCF) as shown in FIG. 2. Upon the connection being established between the two end devices 99, content is transmitted and received between the devices 99 along the transport plane via the IP core 104.

During the connection process, the end devices 99 initiate the call setup sequence, whereby a series of steps are taken to establish connection between the devices 99. One problem which may arise during the call process is a 'request timeout' message or other protocol error that may be generated if the connection between the devices fails at any point. The CSCF servers in the signaling plane receive a protocol error (e.g. 408 SIP error) whenever a request cannot be served within a suitable amount of time. Although, timeout errors occur due to the normal load and traffic conditions in the network, the amount of timeout errors which occur within a desired amount of time will indicate that there is some underlying problem in the transport layer in the network. This is due to the correlation between the signaling plane and the transport plane in which any network connectivity problems in the network plane will be evident in the signaling plane during the call. It should be noted that although the above example is shown between end device operating in the GPRS and IP Core domains, the above example applies between any of the network domains of the converged network.

Figure 3:
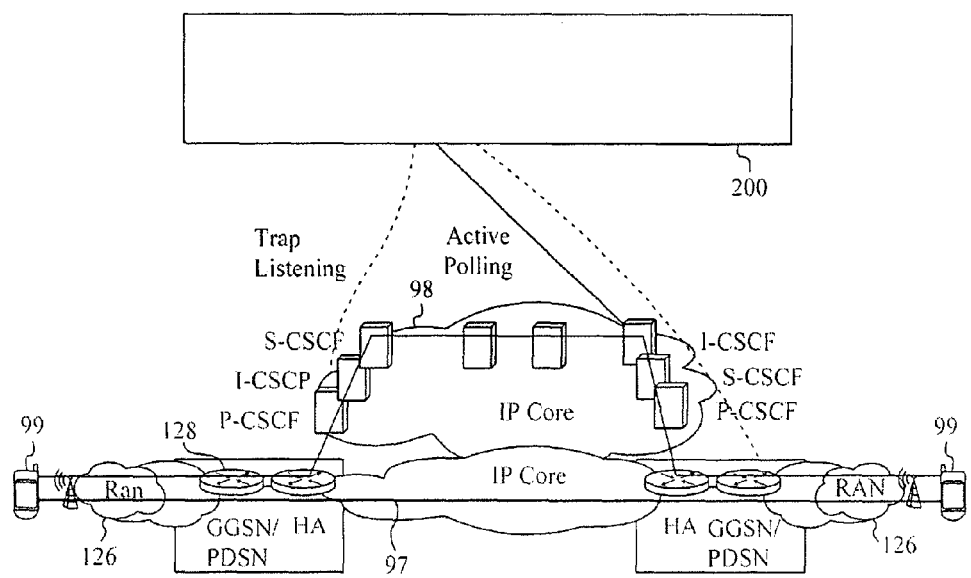
FIG. 3 illustrates an example between two end devices utilizing a monitoring module for identify errors in the signaling and transport planes in accordance with an embodiment.

FIG. 3 illustrates a diagram of the monitoring system in accordance with an embodiment. It should be noted that the embodiment in FIG. 3 is an example in relation to a GPRS network, and that the monitoring module 200 may be configured to communicate with CSCFs and other nodes in domains other than or in addition to the GPRS network. As shown in the embodiment in FIG. 3, a monitoring module 200 is coupled to the GGSN nodes 128 as well as the CSCF nodes and communicates therewith. It should be noted that although only one monitoring module 200 is shown in FIG. 3, any number of monitoring modules 200 may be utilized for a particular network 100. In addition, although the monitoring module 200 is shown connected to the GPRS node as well as one CSCF node, it is contemplated that the monitoring module 200 can be connected to any one or all of the nodes in the network. The monitoring module 200 is a server in an embodiment, although the monitoring module may be software based and be loaded onto the existing components at the nodes (e.g. servers) in which the component performs the task of the monitoring module 200 as discussed herein.

In general, the monitoring module 200 proactively monitors the signaling plane for errors to identify potential problems and anomalites in the overall network and the transport layer. The monitoring module 200 also automatically triggers an alert when a potential problem is detected. Thus, the monitoring module 200 provides a trigger that is common and universal among the different network domains to globally identify and address network connectivity issues in the converged network 100.

In the embodiment in FIG. 3, the monitoring module 200 is configured to send and receive management information with the GGSN and CSCF nodes 128 to determine the status of any connectivity errors which arise in the signaling plane. In an embodiment, the management information and error metrics, such as the number of signaling errors, are provided from one or more of the network nodes to the monitoring module 200. The management information may be received at the monitoring module 200 by traps received from any of the network nodes. Alternatively or additionally, the monitoring module 200 may periodically or continuously poll one or more of the network nodes to receive error message metrics and/or other management information.

The nodes within the different network domains utilize their own network agents and utilize their own protocols and languages. In an embodiment, software is configured on both the monitoring module 200 and the network nodes to allow communication between the nodes and the module 200. In an embodiment, network specific error codes metrics are received by the monitoring module 200, whereby the monitoring module 200 automatically translates or normalizes the network specific codes into common error codes which are universal to all of the individual network domains. In an embodiment, software is configured on each network node which provides management information to the monitoring module 200 to allow the network nodes to normalize the error codes on their own and provide the common error codes to the monitoring module 200. This is advantageous since the signaling and transport plane may span across several network domains, depending on the end devices, and the monitoring module 200 will be able to receive all the error messages from the signaling plane to quickly trigger an alert.

Based on the network agent or network service provider, the monitoring module 200 may be instructed to ignore error messages coming from a particular network domain while continuing to monitor other network domains in the entire network system. This may be advantageous in a situation in which a particular network domain's operator instructs the monitoring module administrator that a transport plane problem has already been identified in the operator's network. The module 200 is would then be able to reallocate resources to monitor error codes in additional and/or other network domains. In another embodiment, the monitoring module 200 may continue to monitor the error messages, but not take them into account in calculating the threshold value.

In an embodiment, the monitoring module 200 stores and keeps track of the number of errors which occur in the signaling plane over a desired period of time. The monitoring module 200 then calculates a threshold value based on the number of errors which occur over the desired amount of time. If the monitoring module 200 calculates that the threshold value of errors has been reached or exceeded for that amount of time, the monitoring module automatically concludes that an underlying network problem exists in the transport plane. As stated, this is due to the correlation between the signaling plane and the transport plane that network problems in the transport plane will surface in the signaling plane during a connection between end devices.

In an example embodiment, the monitoring module 200 determines that a connectivity problem exists in the transport plane 97 if the request timeout errors exceed a threshold value of 15% of all the requests in the network 100. It should be noted that the threshold value, the number of signaling errors as well as the desired amount of time for monitoring are adjustable and are variable input by the network operators or other administrators. This value may be sent by the network operator based on previous experience of the network and/or previous diagnostics. In an embodiment, the threshold value, the number of signaling errors as well as the desired amount of time for monitoring are dynamically and automatically adjusted by the monitoring module 200 or other component in the network based on prior data collected by the CSCF and/or other nodes in the network 100.

In an embodiment, the monitoring module 200 automatically generates an alert throughout the entire network 100 when the threshold value exceeds the defined value within the set period of time. This is advantageous because a common trigger can be used to alert the nodes in the different domains of a network problem. In an embodiment, the alert may be sent from the monitoring module 200 to another component or a node to trigger troubleshooting procedures to further identify the source, if needed, to correct the problem. It is possible for the monitoring module 200 to take into account non-network connectivity errors to further identify and pinpoint the source, if needed, to correct the problem. In an embodiment, the monitoring module 200 displays information related to the management information collected by the monitoring module 200 as well as information (e.g. network topology) related to the alert to assist the network operator in troubleshooting the problem. The monitoring module 200 may send the information to a third party viewer software to provide such information.

In an embodiment, the monitoring module 200 receives only the desired signaling plane error codes which relate to transport plane issues from the network nodes. In an embodiment, the monitoring module 200 receives all signaling plane errors and chooses which errors are transport plane related. The specific error codes are chosen by the monitoring module 200 are programmable by the user. In an embodiment, the monitoring module 200 stores and applies policies such as which threshold values are to be designated for a particular network domain, a particular error code, and/or a particular customer. The monitoring module 200 thus classifies all signaling protocol errors related to an underlying network problem in the transport plane provided that the number of signaling protocol errors exceed the threshold value in the desired time period.

Such error codes among the different domains include, but are not limited to SIP errors 404 ("Not Found"); 408 ("Request Timeout"); 480 ("Temporary Unavailable"); 503 ("Service Unavailable"); and 504 ("Gateway Timeout"). Error codes in the H.248 domain include, but are not limited to errors 503 ("Service Unavailable"); 506 ("Number of Transaction Pendings Exceeded"); 526 ("Insufficient Bandwidth"); 530 ("Temporary Network Failure"); 531 ("Permanent Network Failure); and 906 ("Loss of lower layer connectivity"). Error codes in the MGCP domain include, but are not limited to errors 404 ("Insufficient bandwidth"); 406 ("Transaction Time-Out"); 526 ("Insufficient Bandwidth"); and 902 ("Loss of Lower Layer Connectivity"). It should be noted that other error codes related to network connectivity in both planes may be considered by the monitoring module 200 in calculating the threshold value. In an embodiment, the network operator or other user may manually or automatically choose or program the monitoring module 200 to accept or receive other error codes not directly related to connectivity issues in identifying and troubleshooting transport plane problems.

In an embodiment, the monitoring module 200 automatically triggers a network connectivity troubleshooting procedure upon generating an alert. Such troubleshooting procedure may be a Converged Management Platform (CMP) service path tracing; root cause analysis (RCA) or other network diagnostic program. In an embodiment, the alert from the monitoring module 200 may automatically trigger Quality of Service (QoS) verification procedures. In an embodiment, the monitoring module 200 monitors any sudden increases in signaling errors to identify the location of the potential problem.

While embodiments and applications have been shown and described, it would be apparent to those skilled in the art having the benefit of this disclosure that many more modifications than mentioned above are possible without departing from the inventive concepts disclosed herein. The invention, therefore, is not to be restricted except in the spirit of the appended claims.

What is claimed is:

1. A method for identifying a potential network connectivity problem in a converged network, the method comprising: monitoring, by a monitoring module, a signaling plane in at least a portion of the converged network for error events; and automatically sending, from the monitoring module, an alert identifying a potential network problem in a transport plane upon determining a threshold number of error events occurring in the signaling plane over a selected time period; wherein: the converged network comprises an Internet Protocol Multimedia Subsystem (IMS) that spans more than one distinct network domain; the signaling plane of the converged network is associated with establishing a communication pathway between two end devices; and the transport plane of the converged network is associated with transporting data between the two end devices.

2. The method of claim 1, further comprising classifying, by the monitoring module, the error events based on one or more user defined parameters, wherein the threshold number of error events are based on the classified error events.

3. The method of claim 1, wherein the monitoring further comprises receiving, by the monitoring module, the error events from one or more network nodes in the network.

4. The method of claim 1, wherein the error events correspond to a network connectivity problem in the transport plane.

5. The method of claim 1, wherein the monitoring further comprises:
receiving, by the monitoring module, error code information from a network node in a specific network domain; and
automatically converting, by the monitoring module, the error code information into a common error code.

6. The method of claim 1, wherein the error events from a network node is received by the monitoring module, as common error codes in the converged network.

7. The method of claim 1, further comprising automatically initiating, by the monitoring module, a troubleshooting procedure to correct the network problem upon sending the alert.

8. The method of claim 1, wherein monitoring, by the monitoring module, the signaling plane in the at least a portion of the converged network for error events comprises wherein monitoring, by the monitoring module, the signaling plane in the at least a potion of the converged network for a timeout error from an end device.

9. A system configured to identify a potential network connectivity problem in a converged network, the system comprising: a monitoring module configured to receive management information from a network node regarding error events occurring in a signaling plane across the converged network, wherein the monitoring module is configured to automatically send an alert identifying a potential network problem in a transport plane in the converged network upon receiving a set number of error events occurring in the signaling plane within a selected time period; wherein: the converged network comprises an Internet Protocol Multimedia Subsystem (IMS) that spans more than one distinct network domain; the signaling plane of the converged network is associated with establishing a communication pathway between two end devices; and the transport plane of the converged network is associated with transporting data between the two end devices.

10. The system of claim 9, wherein the monitoring module is configured to classify the error events based on one or more user defined parameters, wherein the threshold number of error events are based on the classified error events.

11. The system of claim 9, wherein the monitoring module is configure to receive error code information from the network node.

12. The system of claim 9, wherein the error events correspond to a network connectivity problem in the transport plane.

13. The system of claim 9, wherein the monitoring module is configured to receive the error events from the network node in a specific network domain and automatically convert the error events into common error events.

14. The system of claim 9, wherein the error event received from the network node is already a common error event in the converged network.

15. The system of claim 9, wherein the alert automatically initiates a troubleshooting procedure to correct the network problem upon sending the alert.

16. The system of claim 9, wherein the monitoring module, when receiving management information from the network node regarding error events occurring in a signaling plane across the converged network, is configured to receive management information from the network node regarding a timeout error from an end device occurring in a signaling plane across the converged network.

17. An apparatus for identifying a potential network connectivity problem in a converged network comprising: means for monitoring a signaling plane in the converged network for error events; and means for automatically sending an alert identifying a potential network problem in a transport plane upon monitoring a set number of error occurring in the signaling plane within a selected time period; wherein: the converged network comprises an Internet Protocol Multimedia Subsystem (IMS) that spans more than one distinct network domain; the signaling plane of the converged network is associated with establishing a communication pathway between two end devices; and the transport plane of the converged network is associated with transporting data between the two end devices.

\* \* \* \* \*